United States Patent
Sandahl

Patent Number: 6,097,944
Date of Patent: Aug. 1, 2000

[54] SYSTEM FOR LINKING TRANSMISSIONS FROM MULTIPLE SITES OVER A WIDE AREA

[75] Inventor: Joel E. Sandahl, Southlake, Tex.

[73] Assignee: Enhanced Messaging Systems, Inc., Southlake, Tex.

[21] Appl. No.: 09/089,106

[22] Filed: Jun. 2, 1998

Related U.S. Application Data

[60] Provisional application No. 60/048,574, Jun. 4, 1997.
[51] Int. Cl.[7] .................................................. H04G 7/20
[52] U.S. Cl. ........................................... 455/422; 455/445
[58] Field of Search ............................. 455/3.1, 3.2, 422, 455/13.1, 426, 38.1, 507, 517, 524, 525, 412, 427, 428, 12.1, 445; 370/312, 316, 341, 350, 503, 465, 40, 399, 901, 401

[56] References Cited

U.S. PATENT DOCUMENTS

| | | | |
|---|---|---|---|
| 4,868,866 | 9/1989 | Williams, Jr. ............................ | 380/49 |
| 5,790,952 | 8/1998 | Seazholtz et al. ...................... | 455/432 |
| 6,023,624 | 2/2000 | Hanson ................................... | 455/458 |

*Primary Examiner*—Reinhard J. Eisenzopf
*Assistant Examiner*—N. Mehrpour
*Attorney, Agent, or Firm*—Kenneth J. LuKacher

[57] ABSTRACT

A system for linking transmissions from multiple wireless transmission sites over a wide area by centrally controlling the batching of transmissions at the sites. The transmission sites are grouped into one or more zones. The system includes a controller (control point equipment) for receiving data representing transmission requests and associating each request with a unique serial number, and for sending transmissions having control information to sites in one or more zones by addressing each of the transmissions with one of a plurality of zone addresses in which each zone address defines one or more zones. For each zone, the controller stores the transmission requests in a master database, with their associated serial number, which are pending for the zone. The control information may be one of three different types: the first type has data representing one of a transmission request and its associated serial number; a second type having batching instructions which identify the serial numbers of the transmission requests to be batch transmitted by a site; and a third type having resynch data specifying serial numbers of the transmission requests stored in the master database for a zone. Each of the transmission sites is responsive only to the received transmissions from the controller having a zone address within a predetermined set of zone addresses. A site is responsive to first type control information by storing received transmission requests with their associated serial number in a database at the site. A site is responsive to second type control information by batching and transmitting the transmission requests stored in its database identified by the serial numbers of the received batching instruction. A site is responsive to third type transmission control information for synchronizing the transmission requests stored in the database of the site with transmission requests identified by the serial numbers of the received resynch data.

42 Claims, 8 Drawing Sheets

13n, the satellite downlinks 14 receive the satellite broadcasts and forward the batched information to the transmitter controllers 15 which decode the batched information and control the transmitters 17 for actual transmission of the batched information via antenna 16. For simulcast transmissions from multiple transmitter sites which are geographically overlapping, the system operation synchronizes the time used for transmission from overlapping sites and the batching information includes a scheduled time of transmission for the batch.

SYSTEM FOR LINKING TRANSMISSIONS FROM MULTIPLE SITES OVER A WIDE AREA

This application claims the benefit of priority from U.S. Provisional Application Ser. No. 60/048,574, filed Jun. 4, 1997, now abandoned.

FIELD OF THE INVENTION

The present invention relates to a system for linking transmissions from multiple transmission sites over a wide area, and particularly to, a system for linking transmission control to multiple transmission sites by centrally controlling the batching and transmission of transmission information at the sites. This system is useful in wireless messaging systems for linking multiple remote wireless transmission sites which may be grouped into zones.

BACKGROUND OF THE INVENTION

Typically in wireless messaging systems, link systems connect the control point(s), where transmission service requests or information enters the system, to the transmission sites, where the wireless service is actually delivered to the customer unit. Transmission service requests represent requests to deliver messages (data or voice) to particular wireless receivers via a network of transmitter sites. Modern wireless messaging systems usually provide wireless transmission services over large geographic areas, such as nationwide service, i.e., a service which provides coverage for the vast majority of the populated areas within a country. The wide geographic scope of these systems often requires the use of data communication systems, such as a satellite or other broadcast link systems, between the control points and the transmission sites.

Generally, wide area messaging systems provide total coverage as a sum of smaller, discrete systems, each discrete system having one or more transmission sites providing coverage for a zone or region. Nationwide service, therefore, may represent the sum of a number of zones or regions, such as Metropolitan Trading Area (MTAs) or states. This piecewise construction of wide area messaging systems impacts link system requirements. As each discrete system of a zone operates essentially as a stand-a-lone system, the typical wide area messaging system must provide for the linking and controlling of a number of discrete transmission systems. In general, for a single zone, customer transmission request information is batched (or grouped) at the control points and then passed over a satellite or other broadcast link systems to transmission sites for subsequent transmission. When customer transmission requests result in transmissions over multiple zones, the same customer transmission request information is multiply batched (one for each zone) and multiply carried as batched information in aggregate over the link system(s). Assuming an efficient transmission control system, the majority of the link bandwidth required for any given discrete zone of a system is the customer transmission request information. For example, if the customer transmission request information is targeted for delivery over two zones, then the customer information is sent, in aggregate, twice per request over the link system, once for each zone. If the customer information were targeted for three zones, then it would be sent three times per request, and so on. The batching of information at the control point equipment to each zone greatly increases link system bandwidth requirements, and thus reduces system efficiency. Moreover, when the link systems are satellite-based, this is very costly as satellite bandwidth has a relatively high cost per bit of broadcast data.

Figure 1:
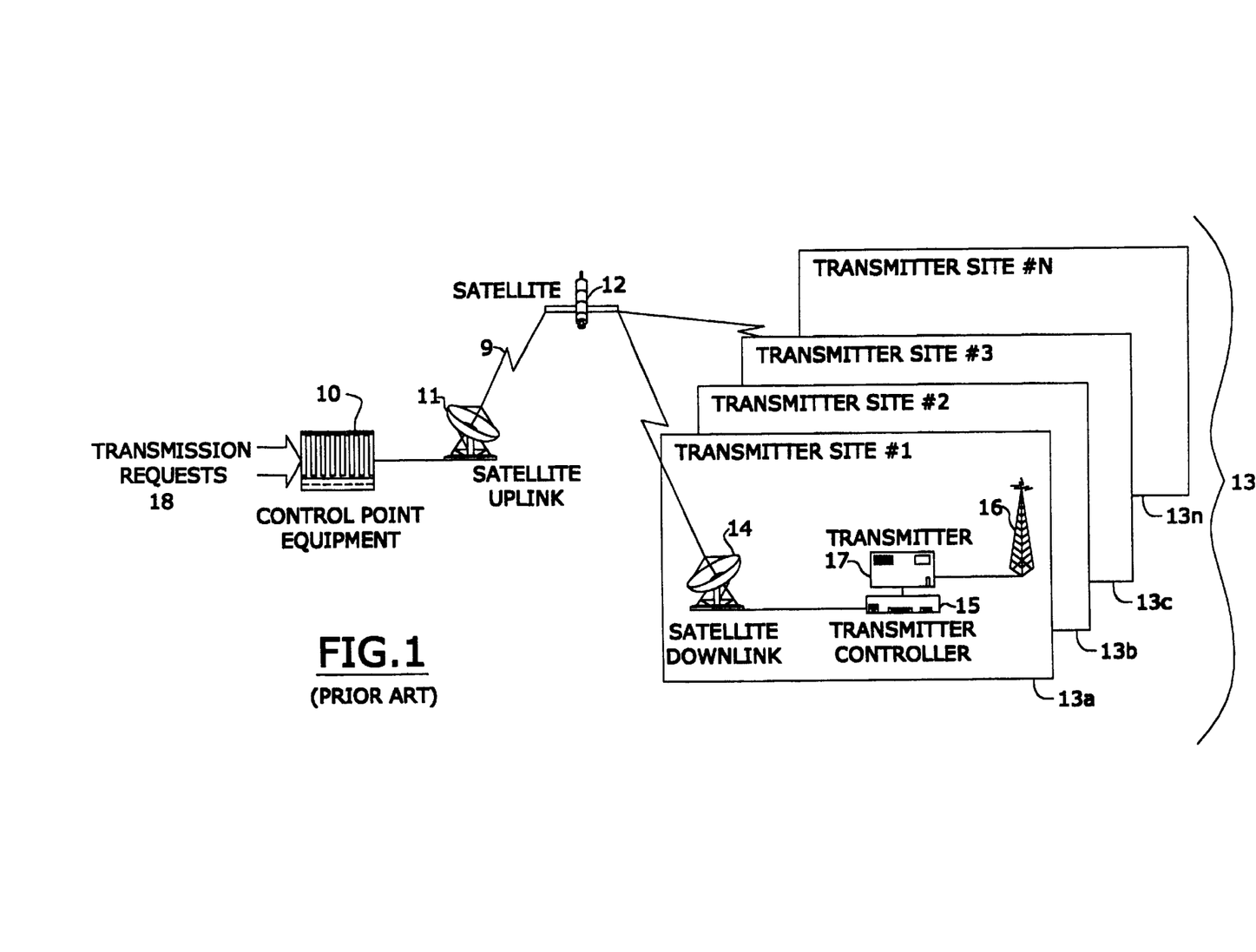
FIG. 1 is a block diagram of a typical basic satellite linked wireless transmission system.
Figure 2:
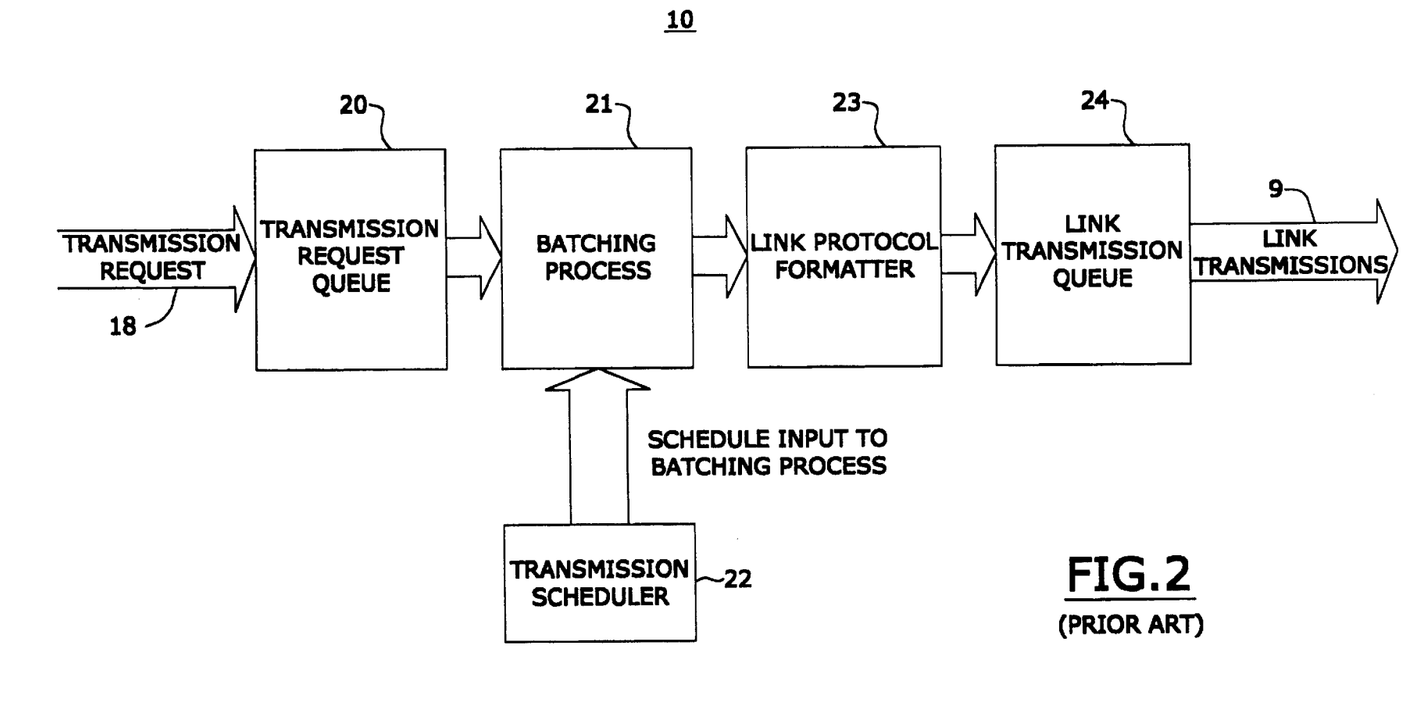
FIG. 2 is a block diagram of the control point equipment of FIG. 1.

The batching at the control point equipment for a conventional link transmission control system is illustrated in FIGS. 1–4. FIG. 1 shows the typical basic link and control of transmissions to a single zone of transmitters. The system includes control point equipment 10, satellite uplink 11 and satellite 12, and the satellite downlinks 14 and transmitter controllers 15 of 1 to N transmitter sites 13. Transmission requests 18 are submitted to the control point equipment 10 which batches groups of transmission requests together, based on rules associated with a transmission protocol, into batched information. The control point equipment 10 forwards the batched information via the satellite uplink 11 and the satellite 12 to the transmitter sites 13 for ultimate transmission. At each of the transmitter sites 13a, 13b, 13c, The control point equipment 10 of FIG. 1 is shown in more detail in FIG. 2. The transmission requests 18 are accepted into a transmission request queue 20. A transmission scheduler 22 provides input to a batching process 21, which pulls transmission requests from the transmission request queue 20 and produces batches of transmission information which are 10 fed to a link protocol formatter 23 to prepare batch information for conveyance over the link system to the transmitter sites 13 (FIG. 1). The link formatted data is placed in the link transmission queue 24 pending actually transmission via the link system at its associated data rate.

Figure 3:
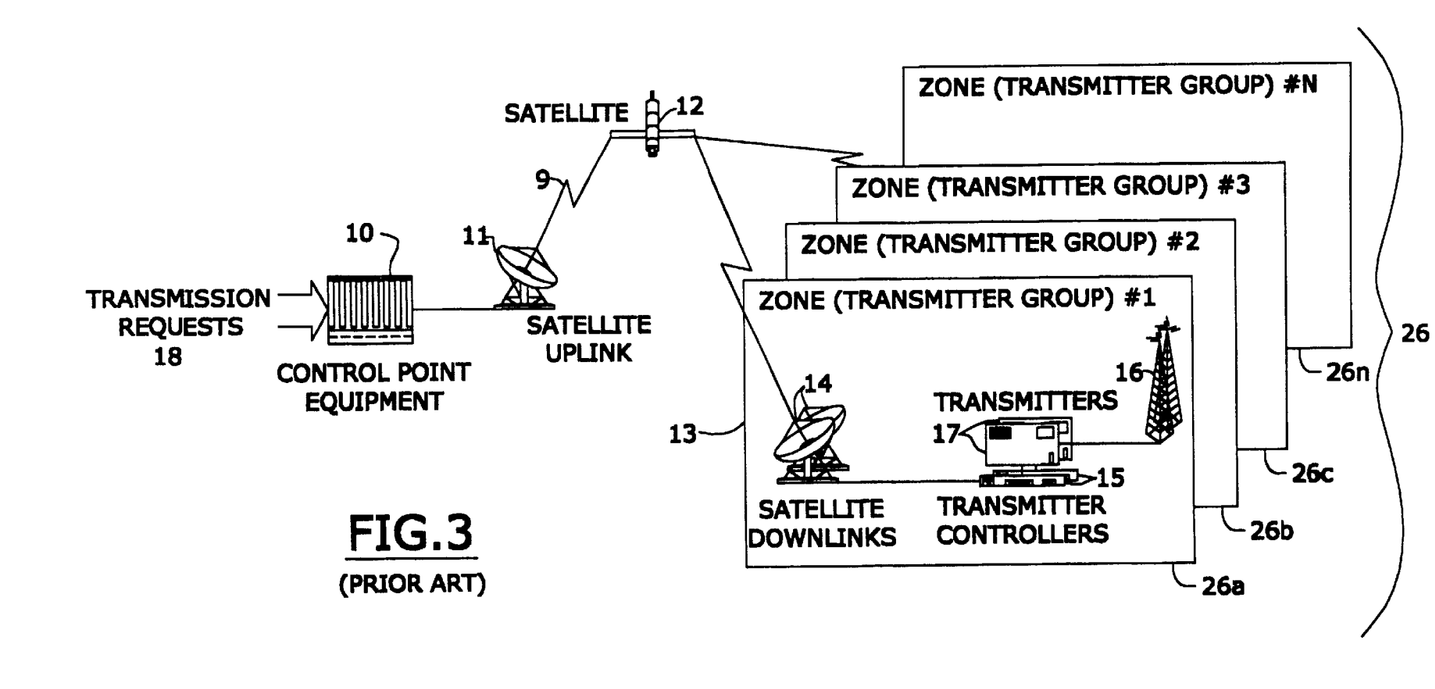
FIG. 3 is a block diagram of a typical multi-zoned satellite linked wireless transmission system.
Figure 4:
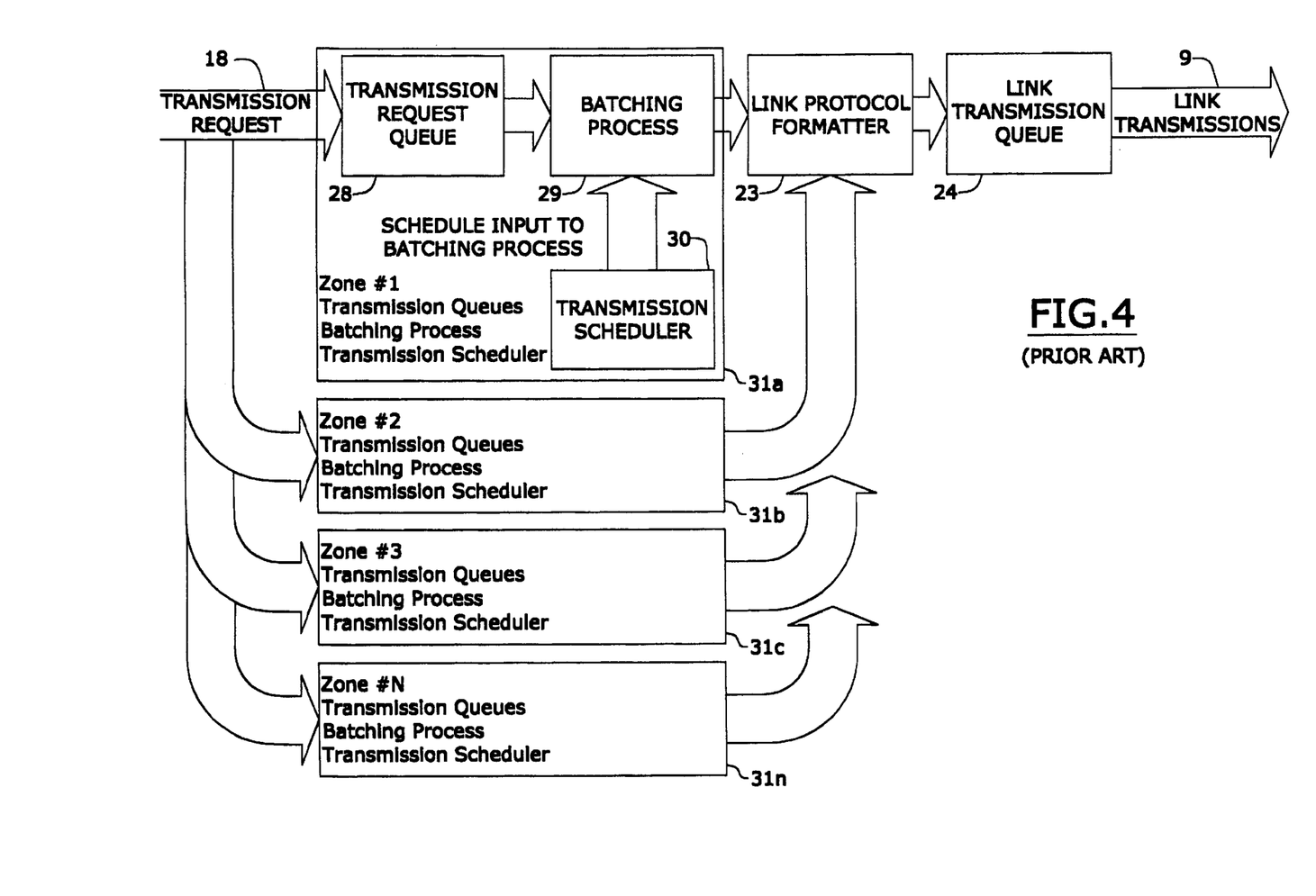
FIG. 4 is a block diagram of the control point equipment of FIG. 3.

Referring to FIG. 3, the typical link and control of transmissions to multiple zones 26 of transmitter sites is shown in which the control point equipment 10 controls transmissions to 1 to N zones 26a, 26b, 26c, . . . 26n. Each zone appears as a group of transmitter sites 13, as shown for example in FIG. 1, where each transmitter site has a satellite downlink 14, transmitter controller 15, transmitter 17, and antenna 16. The batching and transmission of information to multiple zones in the control point equipment 10 is shown in more detail in FIG. 4. For each zone 26 supported by the control point equipment 10, the control point equipment provides for a transmission queue 28, a batching process 29 and a transmission scheduler 30 (illustrated for the zones by blocks 31a, 31b, 31c, . . . 31n, respectively, in which only block 31a is shown in detail). Incoming transmission requests 18 are replicated in one or more transmission queues 28, depending on the service coverage to be provided. The transmissions for each zone are independently managed by the zone's associated transmission scheduler 30 and batching process 29, notwithstanding the shared use of the link protocol formatter 23, link transmission queue 24 and the associated link system. Transmission requests are duplicated for each zone's independent batching use, the batching processes produce batches with duplicates of transmission information and the duplicated information is link protocol formatted and sent over the link system. By duplicating transmitted information to each zone, the amount of information which must be transmitted in the link system is greatly increased, thus increasing the link system's bandwidth requirements and operating costs, and reducing system efficiency.

SUMMARY OF THE INVENTION

Accordingly, the principal object of the present invention is to provide an improved system for linking and controlling the transmissions from multiple sites by batching transmissions at sites, rather than at a control point, thereby reducing the bandwidth requirements for the system, increasing system efficiency and reducing operating costs over prior art link and transmission control systems.

Another feature of the present invention is to provide an improved system for linking and controlling the transmissions from multiple sites in which the sites can detect missing data sent from the control point equipment, and periodically resynchronizes a database at each sites having pending transmission requests to be batched.

A further feature of the present invention is to provide an improved system for linking and controlling the transmissions from multiple sites which enables batching of identical transmission requests from multiple transmission sites in the same zone.

Briefly described, the system embodying the present invention provides for linking transmission control to multiple transmission sites over a wide area in which the sites are grouped into one or more zones. Such zones may be geographic regions. The system includes a controller (control point equipment) for receiving data representing transmission requests and associating a unique serial number (identifier) to each of the transmission requests, and for sending transmissions having control information to sites in one or more zones by addressing each of the transmissions with one of a plurality of zone addresses in which each of the zone addresses defines one or more zones. Each received transmission request has a destination zone address. For each zone associated with the destination zone address, the controller stores each received transmission request in a master database for the zone with its associated serial number while the transmission requests are pending for the zone. The control information may be one of three different types: a first type having data representing one of the received transmission requests and its associated serial number, a second type having batching instructions identifying the transmission requests in accordance with their associated serial numbers to be batched transmitted by a site, and a third type having resynch data for resynchronizing the transmission request data stored in the database of a site with transmission requests stored in the master database for the zone with which the site is part of.

The batching instructions for each zone are produced in accordance with the transmission requests stored in the master database for the zone. Each transmission request when identified in a batching instruction for a zone is removed from the master database for the zone, since such transmission requests once so identified for site transmission are no longer pending. The resynch data for each zone has the serial numbers of transmission requests stored in the master database for the zone.

Each of the sites is responsive to received transmissions with control information from the controller having a zone address within a predetermined set of zone addresses. Each site, responsive to receiving first type control information, stores in a database at the site the data representing the transmission request and associated serial number of the first type control information. Each site, responsive to receiving second type control information, batches the transmission requests stored in the database of the site having serial numbers identified by the batching instructions of the second type control information, and transmits the batched transmission requests. Each transmission request when batched by the site is removed from the database of the site. Each site, responsive to receiving third type control information, resynchronizes the transmission requests stored in the database of the site with transmission requests identified by the received resynch data. A site is considered synchronized when the serial numbers of transmission requests in the database at the site correspond to the serial numbers of the transmission requests stored in the master database of the zone the site is part of, as set forth by received resynch data.

The controller sends transmissions having the first type transmission control information to establish a common database of transmission requests at each site associated with a zone address, and then sends the second type transmission control information instructing each of the sites to batch and transmit specific transmission requests by their serial number which are stored in their databases. Such batched transmissions may be at a scheduled time to transmit which is included in the batching instruction received by the site. Periodically, a third type transmission control information having resynch data is sent to each site associated with a zone address to resynchronize the database of transmission requests at the site with those to be batched and transmitted as specified by the resynch data. If a site database does not have all the transmission requests specified by the resynch data, the site does not participate in batching and transmission until it is synchronized in accordance with subsequently received third type control information. If a site database has the same or additional transmission requests as specified by the resynch data, the site is synchronized after any additional transmission requests are removed from the database.

In the present invention, the batching of transmission requests from customers occurs at the transmission site, thereby providing link efficient wide area transmission control which is especially useful for wireless transmission systems. Accordingly, the present invention provides a site batching control system, since batching of transmissions occurs at transmission sites, in contrast to control point batching in link and control systems of the prior art.

One of the features of the present invention is deterministic batching in that the batching process is independently performed remotely at multiple sites, and the same batched transmissions will result from the same inputs (i.e., transaction requests) at each of the sites. The present invention also provides the feature of having identical databases for batching of transmission requests in the same zone. Batching is centrally controlled or managed to establish "what" batches will be produced "when" at sites in each zone. The batching at the sites accounts for a number of dynamic variables, such as when a batch is to be produced and what the composition of that batch is to be. Since the transmission sites are not coupled together, a central trigger for batching (i.e., batching instruction) is provided to define when and what transmissions for all batching at transmission sites in the same zone should be transmitted.

Other features of the present invention provide for detecting bad or missing data, and resynchronization. The detection of bad or missing data accounts for the probability that data can be corrupted or lost between the control point and each of the transmission sites. Resynchronizing of the batching process, such as following the loss of data, enables databases of sites in the same zone to become resynchronized following the loss of data.

The terms zones and zone addresses used in the below discussion are described as follows. A zone defines an area of transmission coverage, which is ultimately served by a set of transmission sites. A zone address is how a zone is referred to and how information is directed to the associated set of transmission sites. There are two categories of zones, actual and virtual. An actual zone represents a coverage area that is defined only by one or more transmissions sites. This generally constitutes a fundamental simulcast region, such as a city, a greater metropolitan area or a single transmission site. A virtual zone represents a coverage area that is defined by one or more actual zones. Such virtual zones can provide for the piecewise construction of broader coverage areas, such as nationwide service. Further, virtual zones can consist of actual or other virtual zones, such that a virtual zone may refer to one or more virtual zones, each in turn referring to one or more virtual zones and so on. Ultimately, each virtual zone will refer to one or more actual zones, which provide the actual coverage. A zone address may refer to either an actual or a virtual zone.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 5:
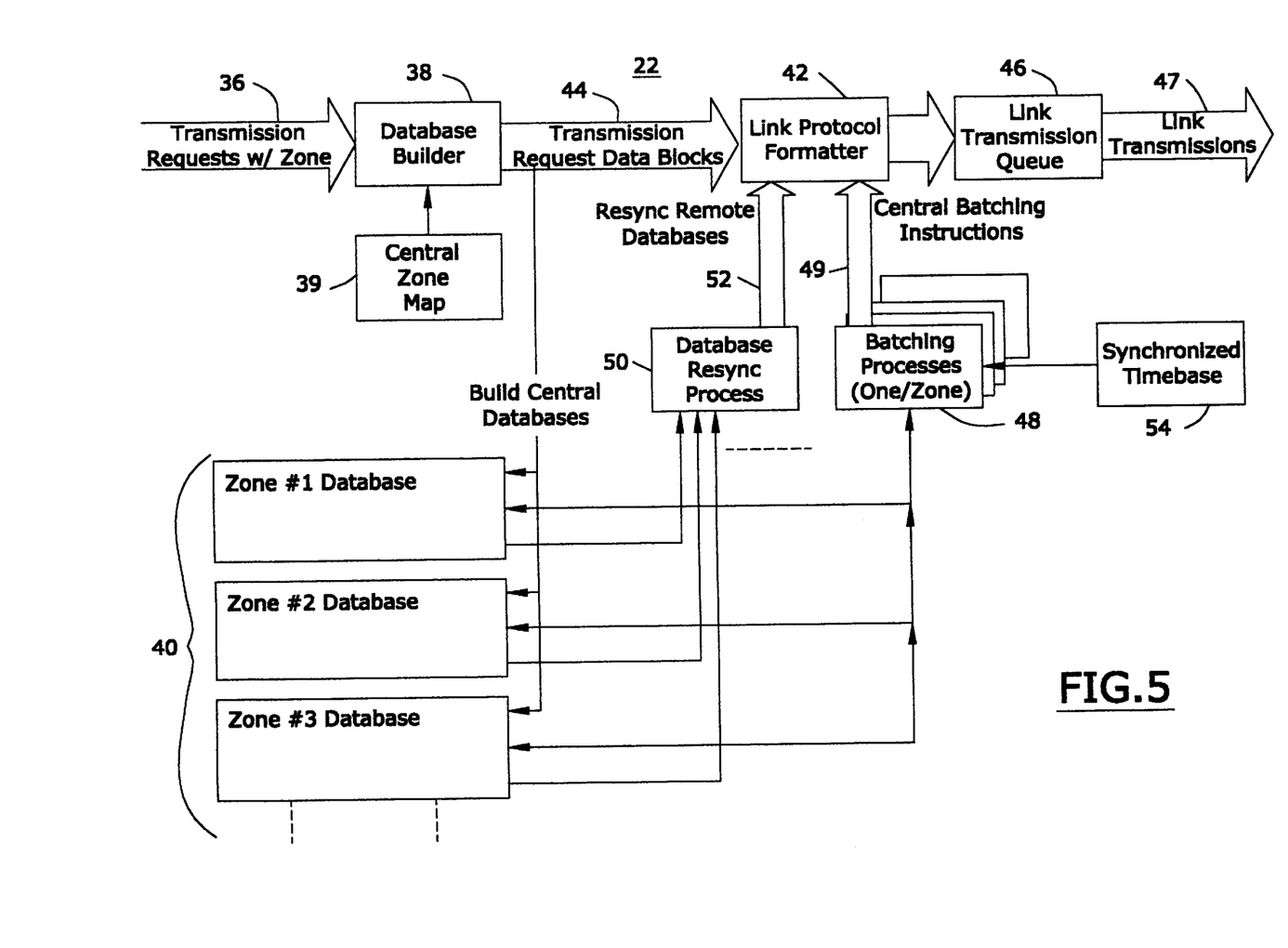
FIG. 5 is a block diagram of the control point equipment for a satellite linked transmission system in accordance with the present invention.
Figure 6:
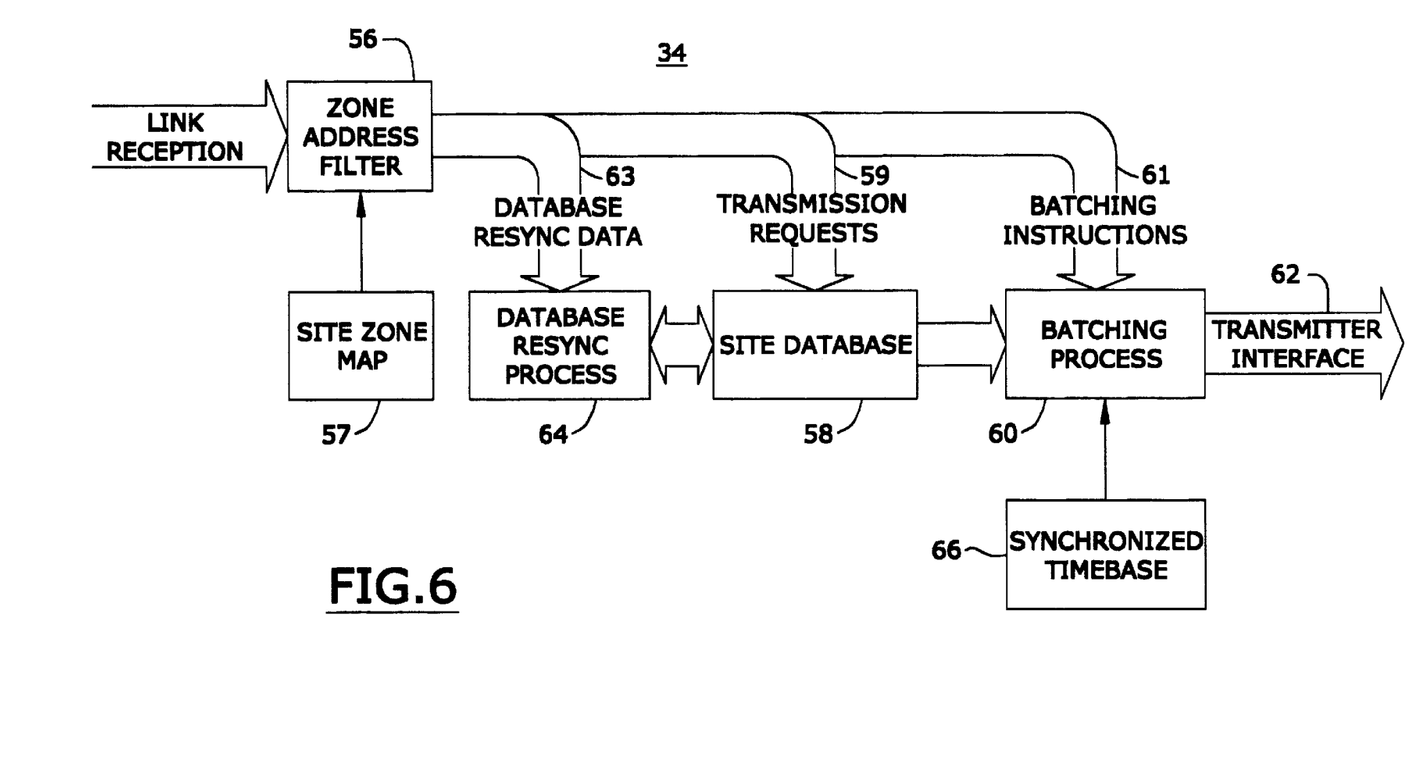
FIG. 6 is a block diagram of the transmitter controller for each of the transmission sites for a satellite linked transmission system in accordance with the present invention.

Referring to FIGS. 5–8, the system of the present invention for linking transmission from multiple transmission sites will be described in which FIG. 5 show control point equipment 32 (controller) at the control point of the system, and FIG. 6 shows the transmitter controller 34 of one of the multiple transmitter sites in the system, respectively. The system of the present invention is similar to the system shown in FIG. 3 in that at the control point, the control point equipment 32 (FIG. 5) represents a programmed computer-based system used to send link transmissions 9, via a satellite uplink 11 and satellite 12, to each transmitter site in the system, and at each transmitter site, a satellite downlink 14 can receive the link transmissions 9 and send them to the transmitter controller 34 (FIG. 6) which represents another programmed computer-based system of the site. The transmitter controller 34 sends signals, responsive to the link transmissions received, over a transmitter tower 16 (antenna) to customers, or other similar output device. Although a satellite link system is illustrated in the figures, any other broadcast link system may also be used. For example, link transmissions in the system may also be sent via non-satellite earth based transmission systems. The data structure of the link transmissions sent by the controller point equipment 32 and received by the transmitter controller 34 will be described in detail in connection with FIGS. 7 and 8.

The system of the present invention operates at the control point and the transmission sites, spanning the link system of the present invention. In summary, the system provides the following operations: building remote transmissions site databases with relevant transmission requests; centrally triggering site batching and transmitting from the remote transmission sites; and providing periodic resynchronization of remote transmission site databases.

Building the remote transmission site databases begins with the receipt by the control point equipment 32 of data 36 representing transmission requests which are each labeled with a destination zone address, as shown in FIG. 5. As stated earlier, a zone defines an area of transmission coverage, which is ultimately served by a set of transmission sites. Each zone is addressed in the system by a zone address. The zone address may be associated with an actual zone (i.e., a zone of a single group of transmitter sites), or to a virtual zone (i.e., representing multiple zones of transmitter sites). The received transmission requests 36 are submitted to the database builder 38 which associates (or assigns) each transmission request with a unique identifier, such as a serial number, adds (or stores) them to the appropriate master zone databases 40 at the control point as determined by a central zone map 39, and builds a transmission request data block 44. The master databases store all transmission requests for all zones pending in the system, until they are serviced by transmission site(s), i.e., identified in a batching instruction sent to site(s). One master database is provided for each actual zone. Although databases 40 for three zones are shown in FIG. 5, more or fewer number of zones may be managed by the control point equipment. Each transmission request data block is coded with zone address information and its data block serialization (e.g., assigned transmission request serial numbers). The coded data blocks are then passed to a link protocol formatter 42, which adds error detection-correction information before submitting the data block to a link transmission queue 46 for subsequent transmission via the satellite link to the transmission sites. These link transmissions represent a first type of control information and are described later as Xmit type transmissions in connection with FIGS. 7 and 8. The satellite link between the control point equipment and transmission sites refers to a satellite transmission system, i.e., uplink, satellite, and downlink, which may be considered a subcomponent system in the system of the present invention. The satellite link to transmission sites may be the same as shown in FIG. 3.

Link transmissions 47 having transmission request data blocks are received at the transmission sites by transmitter controller 34, as shown in FIG. 6. Upon link reception, a zone address filter 56 checks the coded data blocks of the received link transmission for errors, and may correct any errors detected. Data blocks which have been received without error or which have been corrected to be without error are then filtered by the zone address filter 56. The zone address filter is used to discard received data blocks whose zone address information indicates that the contents of the data block are not relevant to the receiving site. This determination is based on information contained in a site zone map 57. The site zone map 57 contains a predetermined list (or set) of all zone addresses that the site should be responsive to. If the zone address of the incoming data block is not found in the site zone map, the data block is discarded as irrelevant. If the zone address of the incoming data block is found in the site zone map, the data block is then processed. Transmission request data blocks 59 are added to (stored at) a site database 58 with their associated serial number. The site databases of the system are stored with one or more transmission requests which can then be batch transmitted from the site in response other link transmissions from the control point equipment as discussed below.

Central triggering of site batching and transmitting begins at the control point equipment 32 of FIG. 5. The control point equipment 32 includes a number of batching processes 48, one for each zone to be managed. The batching process 48 for a zone scans its associated master database 40 of transmission requests for the zone, and constructs a batch of data for transmission, similar to batching processes in typical link systems which are not site batched. When a transmission request is included in a batch of data for transmission, it is removed from the associated database. In contrast with typical link systems, instead of transmitting the batched data over the satellite link, the batching process 48 at the control point equipment 32 produces a batching instruction data block 49 which contains sufficient information which enables the batching process 60 (FIG. 6) in each of the transmission sites to produce the same batch of transmission request data at the same time from the equivalent copy of the database 58 (FIG. 6) of transmission requests stored at each associated site. For example, the batching data block 49 includes a zone address, batching block serialization (such as a batch serial number) and batching instructions (such as serial number associated with transmission requests to be batched, and time set for batch transmission by a site). The batching data block 49 is then submitted to the link protocol formatter 42 where error detection-correction information is added and the block is forwarded to the link transmission queue 46 for subsequent transmission over the satellite link to all transmission sites. These link transmissions represent a second type of control information and are described later as Batch type transmissions in connection with FIGS. 7 and 8.

Link transmissions having batch data blocks are received at the transmission sites, as shown in FIG. 6. Upon link reception, the zone address filter first checks the coded blocks for errors, and may correct any errors detected. Batch data blocks which have been received without error or which have been corrected to be without error are filtered by the zone address filter 56 to discard data blocks whose zone address information indicates that the contents of the data block are not relevant to the receiving site based on information contained in the site zone map 57. If the zone address of the incoming data block is found in the site zone map list, the batch data block is processed. Batching instruction data blocks 61 are fed to the batching process 60 to trigger the production of batched transmissions. Specifically, responsive to the batching instructions, the batching process 60 produces a batch of data for transmission by removing transmission requests from the site database 58 identified by the serial numbers of the transmission requests from the received batch data block. The data batch is then transmitted, via the transmitter interface 62 (similar to transmitter 17 of FIG. 3), to the transmitter site antenna 16 (FIG. 3) or other similar output device.

Periodic resynchronization of the remote transmission site databases 58 is required to provide recovery in the event that transmission request data blocks or batching instruction data blocks are lost in transit to the sites. This begins with the database resync process 50 of the control point equipment 32 of FIG. 5. The database resync process 48 scans each of the master databases 40 and produces database resync data blocks 52 which indicate which serialized transmission request data blocks still contain valid requests for transmission which are pending, but have not yet been serviced, i.e., transmission requests transmitted to site which have yet to be identified in a batch instruction for transmission by sites of the zone. The database resync data blocks 52 is coded by the database resync process 48 to include a zone address, data block serialization (such as a resynch serial number) and transmission request serialization information for pending transmission requests for the zone as stored in the master zone database (such as serial numbers, or range thereof, associated with transmission requests). The coded database resync data blocks are then forwarded to the link protocol formatter 42 which adds error detection-correction information and passes the data block onto the link transmission queue 46 for subsequent delivery to the transmission sites via the satellite link. These link transmissions represent a third type of control information and are described later as Resync type transmissions in connection with FIGS. 7 and 8.

Link transmissions having resync data blocks are received at the transmission sites, as shown in FIG. 6. Upon link reception, the zone address filter first checks the coded blocks for errors, and may correct any errors detected. Batch data blocks which have been received without error or which have been corrected to be without error are filtered by the zone address filter 56 to discard data blocks whose zone address information indicates that the contents of the data block are not relevant to the receiving site based on information contained in the site zone map 57. If the zone address of the data block is found in the site zone map 57, the data block is processed by transmitter controller 34. Database resync data blocks 63 from the link transmission received are fed to the database resync process 64 which uses the information from the data blocks to synchronize the site database 58, i.e., to determine whether the site database is sufficiently synchronized enable the site to participate in batching and transmission. The resynch process 64 is described later in more detail.

The system further allows for synchronized timebases for simulcast operation. At the control point equipment 32, a synchronized timebase 54 provides real-time information to the batching process 48 so that it can schedule batch transmissions at an appropriate amount of time into the future to accommodate, via the satellite link, the delivery of data to the transmission sites and the site processing of data delivered to the transmission sites. At the transmission sites, a synchronized timebase 66 provides the necessary timing signal for the synchronous starting of transmissions. The synchronized timebases 54 and 66 must provide uniform real-time information to all locations within the system. There are many methods of achieving synchronized time, such as Global Positioning Satellite (GPS) receivers. For simulcast transmission control systems, regardless of batching and control methodologies, the overriding requirement is for all sites in a given simulcast zone to produce identical transmissions, in time and content. The use of the invention is not limited to simulcast systems.

Figure 7:
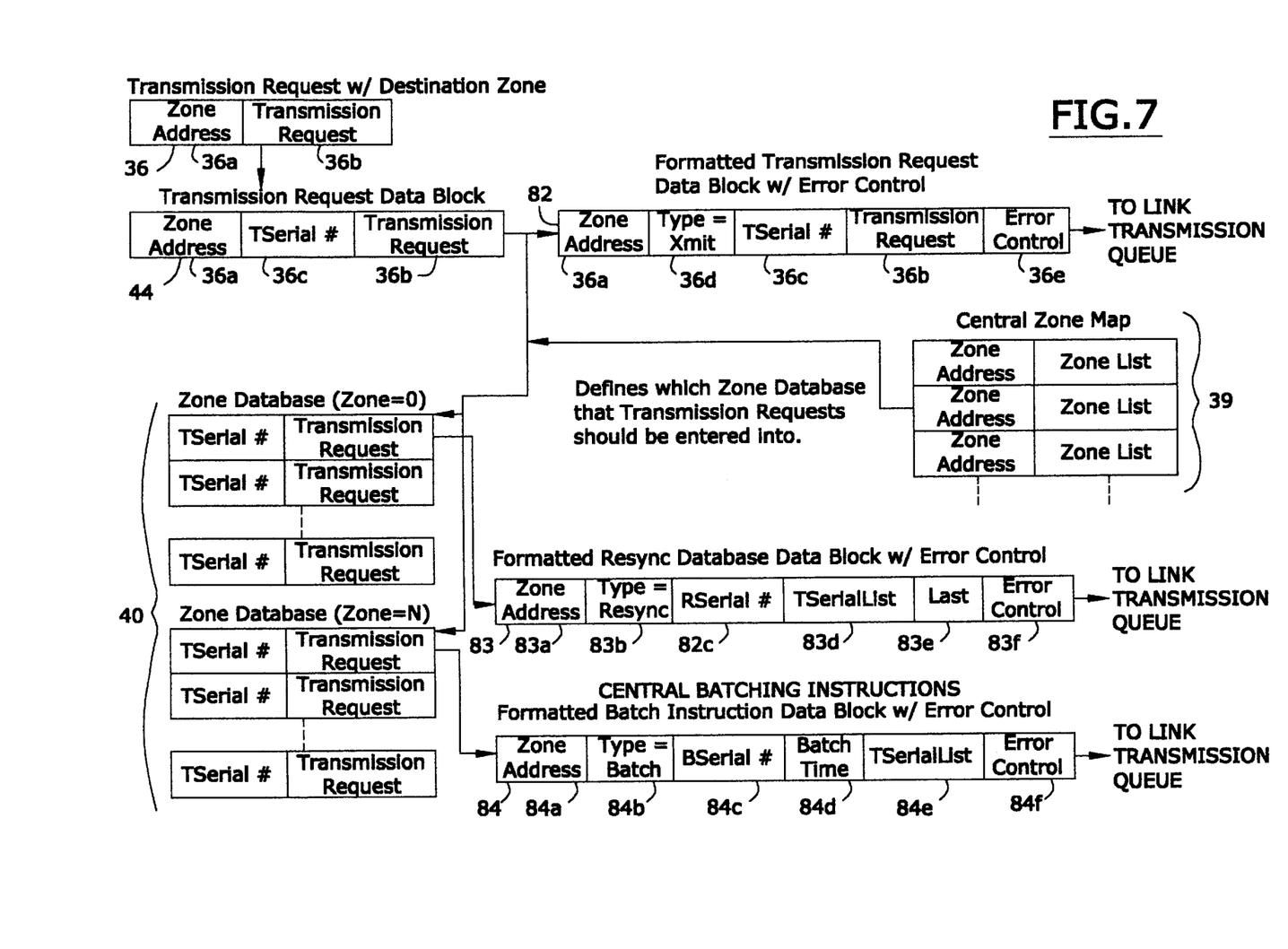
FIG. 7 shows the data structures used in the control point equipment of FIG. 5 for producing three different types of control information for transmission to sites.
Figure 8:
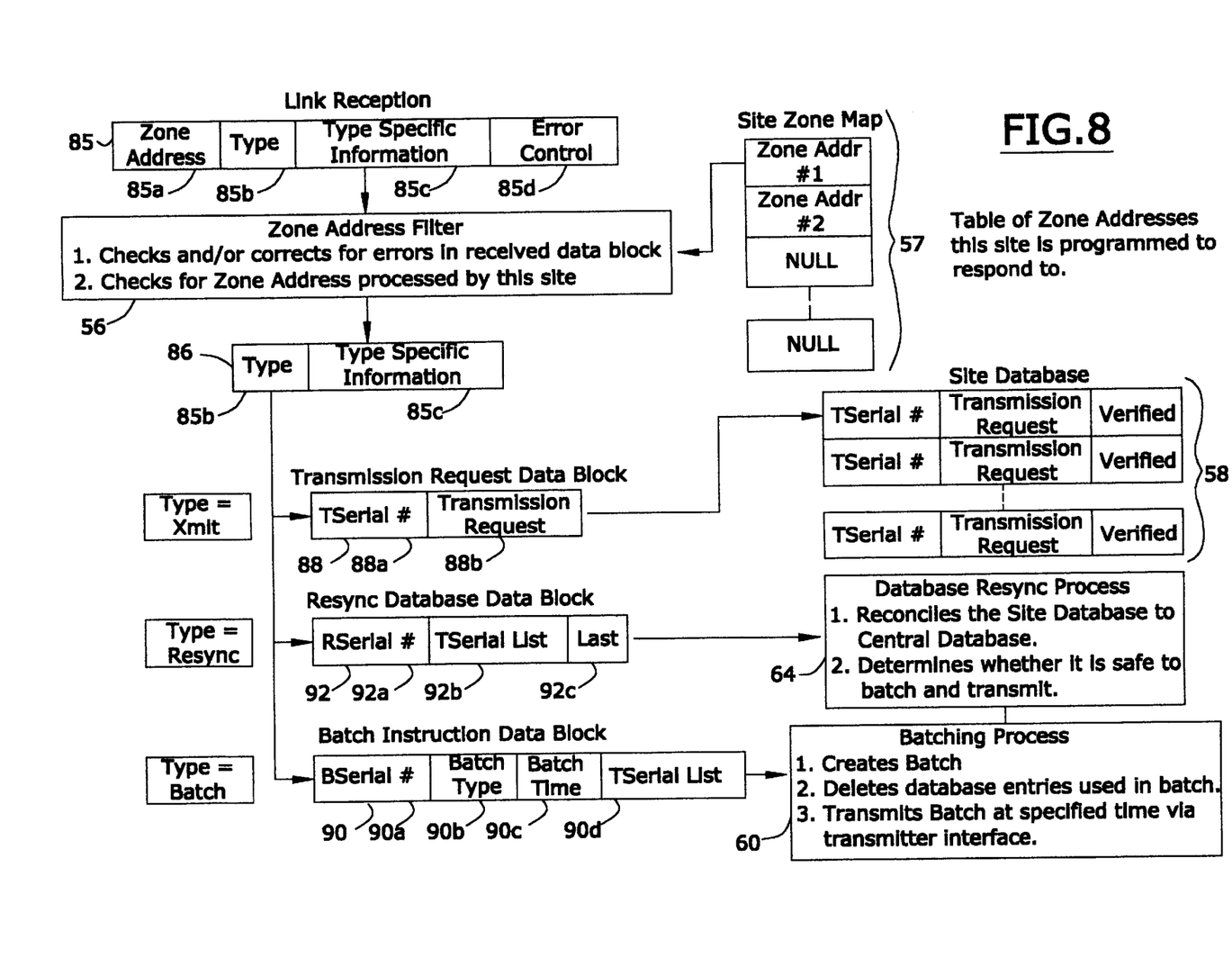
FIG. 8 shows the data structures used at the transmission site of FIG. 6.

Referring to FIGS. 7 and 8, the data structures used in the system are shown, in which FIG. 7 shows the data structures at the control point equipment 32, and FIG. 8 shows the data structures by the transmission controller 34 at each of the transmission site. The production of each type of control information and the response of each site to such control information will be discussed below in terms of these data structures.

In FIG. 7, the control point equipment 32 receives data 36 representing a transmission request 36a with a destination zone address 36b. Specifically, the data representing the transmission request contains an address code for ultimately addressing the wireless device (such as a pager) to be signaled, and the data to be delivered to the addressed wireless device. The destination zone address represents the zone address of the transmission site(s) that will ultimately fulfill the transmission request. The database builder 38 (FIG. 5) transforms the transmission request into a transmission request data block 44 by adding a transmit request serial number 36c, TSerial#, to data 36. The TSerial# is sequentially assigned to each successive transmission request received by the control point equipment 32. The TSerial# field is sufficiently large to assure that all unserviced transmission requests in the system will have a unique number. The number rolls over to zero at the top of its range. The database builder 38 (FIG. 5) applies the transmission request data block 44 to each of the master zone database(s) associated with the destination zone address 36a. This is determined by looking up the zone address 36a in the central zone map (or table) 39, which defines the one or more actual zones which serve the zone address 36a. As stated earlier, there is one master zone database for each actual zone. The database builder 38 also adds a type field 36d to data block 44. The type field 36d is set to a value representing that the data block is of a Xmit type and has a transmission request data block (36c and 36b). The database builder submits the tranmission request data block to the link protocol formatter 42 (FIG. 5) for distribution to transmission sites which are associated with the zone address 36a, so that such sites can build their site databases 58 (FIG. 6) with the transmission request data block. Each master zone database 40 associated with the zone address 36a (as determined by central zone map 39) stores the transmission request 36b and its associated TSerial# 36c in its table. The link protocol formatter 42 adds error control information 36e to the data block 44 and sends the resulting data block 82 to the link transmission queue 46 for transmission to the sites via the satellite link.

Referring to FIG. 8, at the transmission sites each formatted data block 85 is received as a link reception from the satellite link with data blocks containing a zone address 85a, type 85b, type specific information 85c, and error control fields 85d. The type specific information 85c depends on the type of control information in accordance with type 85b. The zone address filter 56 checks for, and corrects for, errors in the received data block. It then checks to see if the resultant data block is relevant to this site. This is accomplished by looking to see if the zone address 85a is listed in the site zone map (or table) 57. If a matching entry is found, then the site processes the data blocks with that zone address and the data block is passed on for further processing, else it is discarded. If the data block is passed on, the zone address 85a and error control 85d fields are discarded, leaving the type 85b and type specific information fields 85c, as shown by data block 86. The type field 85b is then used to steer processing of the data block 86. When type 85b equals to "Xmit", the type specific information field 85c contains a transmission request data block 88 which is added to the site database 58, including its TSerial# 88a and transmission request 88b. This provides for the distribution of the transmission request database to all transmission sites in the system.

Referring back to FIG. 7, for central batching control the control point equipment 32 (FIG. 5) uses an independent batching process 48 (FIG. 5) for each of the master zone databases 40. As stated earlier, the batching process 48 scans its associated master zone database 40 and produces a batch of data for transmission. As a database of transmission requests have already been communicated to the transmission sites to be affected, the batch of data need not be sent to the transmission sites. The batching process 48 communicates batching information to the transmission sites in the form of a batch instruction data block 84 which is addressed to the zone address of an associated master zone database, and contains the following fields: a Zone Address 84a, Type 84b, BSerial# 84c, Batch Time 84d, TSerialList 84e and Error Control 84f. For central batching control, the type field 84b is set to "Batch" (or a value representing Batch). BSerial# field 84b is sequentially assigned to each successive batching instruction data block 84 for each master zone database. The BSerial# field is sufficiently large to assure that all unserviced batch instruction data blocks for each zone will have a unique number. The BSerial# rolls over to zero when it exceeds its maximum value. The batch time field 84c defines the scheduled time in the future when the batch is to begin transmission from all affected sites. The TSerialList 84e provides a reference list of TSerial#s which should be used in the construction of the batch. The TSerialList may represent a range of TSerial numbers of the transmission requests to be included in the batch, such as two TSerial#s representing the start and end of this range. Such TSerial numbers referenced in TSerialList are removed from the master zone database for the zone address 84a. The error control field 84f provides for the detection and correction of link transmission induced errors in the data block. The batching process 48 for the zone produces the formatted batching instruction data block 84 (FIG. 5), except for the error control field 84e which is added by the protocol link formatter 42 (FIG. 5).

At the transmission sites, shown in FIG. 8, the batching instruction data block 84 is received as a formatted data block 85. After passing through the zone address filter 56, described earlier, the type field 85b with a value of "Batch" causes the type specific information field 85c to be passed to the batching process 60 as a batching instruction data block 90. Batching process 60 first checks to see if BSerial# 90a is the next sequential entry from the last BSerial# received by the site. If not, then batching data has been lost and the batching process 60 sets a Resync Flag noting that the site requires database resynchronization before it can transmit data. The Resync Flag is a variable or register in the transmitter controller 34 which can be set to a value indicating that resynchronization of the database is required. The batching process 60 uses the TSerialList 90d to construct a batch of data from the transmission request in the site database corresponding to the TSerial#'s associated with the TSerialList 90d. As each TSerial# is used to construct the batch of data, it is removed with the transmission request from the site database 58. If not all of the TSerial#s in the TSerialList are found in the site database 58, then batching data has been lost and the batching process sets the Resync Flag. If the Resync Flag is set, then the batching process 60 aborts any attempt to transmit the batch of data, else it uses the batch time 90c to schedule the start time for the transmission of the batched data. At that specified time, the batched data is transmitted via the transmitter interface to the transmitter antenna.

For periodic resynchronization of remote transmission site databases, the database resync process 50 (FIG. 5) periodically initiates the transmission of a series of resync database data blocks 52. The periodic interval is defined by the user to balance link system bandwidth overhead, consumed to effect link system transmission of the data blocks, and site data loss recovery time. Short intervals will result in large amounts of link bandwidth being used to transmit resynchronization, but will reduce the site recovery time from link data loss. Long intervals minimize link system bandwidth usage, but lengthen site recovery time from link data loss. The goal of resynchronization is to communicate to the transmission sites what database elements (transaction requests) are required at the site to do precise, deterministic batching. The database resync process 50 does this by transmitting a "snapshot" of valid, pending master database entries per zone as a series of resync database data block transmissions. The "snapshot" is taken between batches for the zone. The series of data blocks provide for the communication of large database sizes. After a resync data block 52 from the database resync process 50 is produced and then processed by the link protocol formatter 42, the resulting formatted resync database data block 83 (FIG. 7) consists of the following fields: Zone Address 83a, Type 83b, RSerial# 83c, TSerialList 83d, Last 83e and Error Control 83f. The Zone Address field 83a provides for the addressing of information to the appropriate, affected sites. The Type field 83b is set to "Resync"(or a value representing Resync), denoting a resync data block. The RSerial# 83c indicates which sequential data block this is in a sequence of data blocks for each resynchronization cycle produced in accordance with a master zone database for a zone. RSerial#s are assigned sequentially from zero for each data block in the sequence of data blocks for this zone and this cycle of resynchronization. The Last field 83e indicates that this is the last resync data block for this zone. The TSerialList 83d is a list of TSerial#s still pending in the master zone database associated with zone address 83a at the control point for subsequent batching and transmission. Error Control 83f provides for error detection or correction of data in the block.

At periodic intervals, the database resync process 50 of the control point equipment 32 (FIG. 5) will take each one of the master zone databases 40, one at a time, and send one or more resync database data blocks via the satellite link to transmission sites. For each zone, the control point equipment 32 scans the master zone database for database elements (i.e., transmission requests) still pending transmission and build resync database data blocks. For large numbers of pending elements, this can take multiple data blocks. In each data block, it will place: the zone number for the current database in the zone address field 83a; "Resync" (or a value representing Resync) in the Type field 83b; the current resync data block number for this zone in the RSerial# field 83c; set Last 83e to non-zero if this is the last resync data block for this zone; a variable number of TSerial#s in the TSerialList fields 83d; and error control information for the constructed block in the Error Control field 83f. Once the database resync process has scanned and sent data blocks for one master zone database, it will move to the next master zone database until all master zone databases have been processed. The database resync process 50 will then wait until the next interval is due and repeat the process with new "snapshots" of the databases for each zone.

As shown in FIG. 8, for database resynchronization at the transmission sites the link transmission having resync database data blocks are received and passed through the zone address filter 56. As stated earlier, the zone address filter checks for errors in the received data blocks 85 and corrects any errors found, if possible. If the data block contains errors which cannot be corrected, then it is discarded. If the data block is without errors, then the data block is processed by the site based on the value of its Type field 85b. All resync database data blocks for this site will have a zone address field 85a matching an entry in the site zone map 57 and a field type 85b of "Resync".

The database resynch process 64 utilizes variables or registers including, RSerialCnt which represents a counter used to check if the RSerial# of each received resync database data block is proper, a ResyncErr flag which can be set to a value indicating that an error has occurred during resynchronization. The site database 58 for each TSerial# and associated transmission request entry has a field representing a Verified flag, as shown, for example, in FIG. 8. If the RSerial# field 92a is equal to a 0 (zero), then this is the first data block for resynchronization and the RSerialCnt (RSerial# counter) will be set to 0, the ResyncErr flag will be cleared (reset) and all Verified flags in the Site Database will be cleared (reset). If the RSerial# field received is not equal to 0, then that RSerial# received must be equal to RSerialCnt+1 or the site will set the ResyncErr flag. The RSerialCnt is then set to received RSerial#. If the ResyncErr flag is set, the site will do no more processing of the data block, since the resync database data blocks were not successfully received by the site.

For each TSerial# in the TSerialList, the site (resync process 64) will check the site database 58 for the element (i.e., transmission request) having that TSerial#. If the element exists in the site database, then the Verified flag associated with the element will be set. If the element does not exist in the site database 58, then the Resync flag and the ResyncErr flags will be set and, for diagnostic purposes, an exception is noted in an error log at the site. Thus, Resync flag is set if any transmission requests specified by the resync database data blocks are missing. These missing transmission requests may have been lost in transmission to the site.

If either the Resync or ResynchErr flags are set, the site will not participate in further batching and transmission of transmission requests since the site cannot be resynchronized at this time, i.e., the site database has less transmission requests than specified in the master zone database associated with the site. However, such a site will continue to receive and store transmission requests in its site database and respond to subsequent resync database data blocks, as described above. The site may later be resynchronized responsive to subsequently received resync database data blocks.

If Last flag 92c is set and the ResyncErr flag is clear (i.e., not set), then the site will: delete any site database elements that do not have the Verified flag set, clear the Resync flag, and clear the ResyncErr flag. Site database elements which do not have a Verified flags set may represent additional transmission requests which were not batched and transmitted responsive to batching instructions sent by the control point equipment. The site is now resynchronized to its associated master zone database in the control point equipment 32, and will participate in batching and transmitting transmission requests in the system.

The described system is particularly applicable to transmission control for wide area wireless messaging systems. The invention, however, might also be applied to other types of wide area information distribution systems. Further, the control point equipment 32 may send the three different types of transmission control information, i.e., Xmit, Batch, and Resynch, in the same or different transmissions to sites. Further, the sites in the system although only acting responsive to transmission control information for the zone address (es) associated with each site, may monitor the batch (BSerial#), resync (RSerial#), or transmit (TSerial#) serial numbers in control information destined for one or more zone addresses not associated with the site.

From the foregoing description, it will be apparent that there has been provided an improved system for linking transmission control to multiple wireless transmission sites over a wide area. Variations and modifications in the herein described system in accordance with invention will undoubtedly suggest themselves to those skilled in the art. Accordingly, the foregoing description should be taken as illustrative and not in a limiting sense.

What is claimed is:

1. A system for linking transmission control to multiple transmission sites over a wide area in which said sites are grouped into one or more zones, said system comprising:

a controller for receiving data representing transmission requests and associating a unique identifier to each of said transmission requests, and for sending transmissions having control information to sites in one or more zones by addressing each of said transmissions with one of a plurality of zone addresses in which each of said zone addresses defines one or more zones;

said control information being one of a plurality of different types in which a first of said types of control information has data representing one of said received transmission requests and its associated identifier, and a second of said types of control information has batching instructions identifying the transmission requests in accordance with their associated identifiers to be batched transmitted by a site;

each of said sites having a database for storing received transaction requests with their associated identifier; and each of said sites being responsive to received transmissions with said control information from said controller having a zone address within a predetermined set of zone addresses, wherein the site, responsive to said first type of control information, stores the data representing the transmission request and associated identifier of said first type control information in the database at the site, and the site, responsive to said second type of control information, batches the transmission requests stored in the database of the site having identifiers identified by the batching instructions of said second type of control information, and transmits said batched transmission requests.

2. The system according to claim 1 wherein said controller further comprises a master database for each of said zones for storing transmission requests pending for transmission by transmission sites of the zone, wherein said controller stores each of said received transmission requests with its associated identifier in one or more of the master database associated with the zones having transmission sites which will transmit said transmission request, and the batching instructions for each zone are produced by said controller in accordance with said transmission requests stored in the master database for the zone.

3. The system according to claim 2 wherein each of said transmission requests received by said controller has a destination zone address for the transmission request, and said controller further comprises a zone map for associating the destination zone address to one or more zones, wherein said controller for each of said received transmission requests stores the transmission request with its associated identifier in the master database for each zones associated with the destination zone address of the received transmission request in accordance with said zone map.

4. The system according to claim 2 wherein said controller further comprises means for producing said second type of control information for each zone comprising:

means for identifying in the master database for the zone one or more transmission requests by their associated identifiers to be batched transmitted by sites in the zone;

means for producing the batch instructions for said second type of control information comprising data representing said identifiers of the transmission requests to be batch transmitted; and means for removing from said the master database for the zone the transmission requests identified in said batching instructions.

5. The system according to claim 4 wherein said identifiers represent serial numbers, and said data representing the identifiers of the transmission requests to be batched transmitted represents a range of said serial numbers of the transmission requests identified by said identifying means.

6. The system according to claim 4 wherein said means for producing said second type of control information for each zone further comprises:

means for assigning a sequential batch serial number for each batch instructions for said second type of control information, in which said second type control information comprising said batching instructions and its associated batch serial number.

7. The system according to claim 6 wherein each of said sites comprises means for determining in accordance with said batch serial number of the batching instructions from multiple ones of said transmissions of second type of control information when a batching instruction has been lost.

8. The system according to claim 1 wherein said batching instructions of said second type of control information comprises time information representing the time to transmit the batch of transmission requests identified by said batching instructions, and each of said sites, responsive to said second type of control information, batches the transmission requests stored in the database of the site associated with the identifiers identified by the batching instructions of said second type of control information and transmits said batched transmission requests at the time to transmit specified by said time information of said batching instructions.

9. The system according to claim 8 wherein said controller comprises first means for producing time signals representing synchronous time for said system, and each of said sites comprises second means for producing time signals representing the synchronous time for said system, in which said controller produces said time information representing a time in the future based upon said time signals from said first means, and each said site transmits the batches transmission requests at the time specified by said batching instructions of said second type of control information in accordance with said time signals from said second means at the site.

10. The system according to claim 1 wherein another one of said plurality of different types of said control information is a third type of control information having data for resynchronizing the transmission request data stored in the database of a site with transmission requests to be batched by the site for transmission by the site.

11. The system according to claim 10 wherein each of said site, comprises means responsive to said third type of control information for resynchronizing the database of the site.

12. The system according to claim 10 wherein said controller further comprises:

a master database for each of said zones for storing transmission requests pending for transmission by transmission sites of the zone, wherein said controller stores each of said received transmission requests with its associated identifier in one or more of the master database associated with the zones having transmission sites which will transmit said transmission request; and means for producing said third type of control information for each zone having means for identifying in the master database for the zone one or more transmission requests by their associated identifiers, wherein said data for resynchronizing representing said identifiers of the transmission requests identified by said identifying means.

13. The system according to claim 12 wherein each of said site, comprises means responsive to said third type of control information for resynchronizing the database of the site having means for verifying that the presence in the database of the site for each of the identifiers of the transmission requests identified by said third type of control information, means for disabling said site from batching and transmitting when less than the transmission requests identified by said third type of control information are present in the said database, until said database of the site is resynchronized responsive to subsequently received third type of said control information, and means when more than the transmission requests identified by said third type of control information are present in the database of site for removing those transmission requests from the database of the site.

14. The system according to claim 12 wherein said third type of control information comprises a plurality of transmissions to a zone in which each of said plurality of transmissions is associated with a sequential serial number for said third type of control information.

15. The system according to claim 14 wherein each site comprises means for determining, responsive to said serial number for said third type of control information from one or more of said plurality of transmissions of third type of control information, when one or more of said plurality of transmissions have been lost.

16. The system according to claim 1 wherein said identifier associated with each transmission request represents a serial number.

17. The system according to claim 1 wherein each transmission sent from said controller has data for use by said site for transmission error correction and detection.

18. The system according to claim 1 wherein each said site has a zone site map corresponding to said predetermined set of zone addresses the site is responsive to, and means for determining based on said zone site map when received transmissions has control information for the site.

19. The system according to claim 1 wherein each of said different types of control information sent to site has a field indicating the type of control information, and each of said sites respond to received transmission within their predetermined set of zone addresses in accordance with said field of said transmission.

20. The system according to claim 1 further comprising means for communicating between said controller to said sites, wherein said controller and sites utilize said communicating means to send and receive, respectively, transmissions of said control information.

21. The system according to claim 1 wherein said transmissions to said sites by said controller include single or multiple ones of said control information.

22. The system according to claim 1 further comprising means for sending transmissions by said controller and means for receiving transmissions from said controller by said sites, in which said sending means and receiving means utilize a satellite communication system.

23. The system according to claim 1 wherein said system is part of a wireless transmission system.

24. A method for linking transmission control to multiple transmission sites over a wide area in which said sites are grouped into one or more zones, said method comprising the steps of:

receiving transmission requests and associating a unique identifier to each of said transmission requests;

sending transmissions having control information to sites in one or more zones by addressing each of said transmissions with one of a plurality of zone addresses in which each of said zone addresses defines one or more zones, said control information being one of a plurality of different types in which a first of said types of control information has one of said received transmission requests and its associated identifier, and a second of said types of control information has batching instructions identifying the transmission requests in accordance with their associated identifiers to be batched transmitted by a site;

receiving at each of said sites said transmissions with said control information;

storing at each of said sites in a database, when a received transmission has a zone address within the predetermined set of zone addresses for the site and said received transmission has first type control information, the transmission request and associated identifier of the first type control information;

batching at each of said sites, when said received transmission has a zone address within the predetermined set of zone addresses for the site and said received transmission has second type control information, the transmission requests stored in the database of the site having identifiers identified by the batching instructions of said second type of control information; and transmitting at each of said sites transmission requests batched by the site.

25. The method according to claim 24 further comprises the step of storing in a master database for each of said zones having sites from which said received transmission requests will be transmitted which have not been batched by the sites of the zone, and the batching instructions for each zone are produced in accordance with said transmission requests stored in the master database for the zone.

26. The method according to claim 24 wherein another one of said plurality of different types of said control information is a third type of control information which has data identifying the identifiers of the transmission requests which should be stored in the database of a site.

27. The method according to claim 24 further comprising the step of resynchronizing at each of said sites, when said received transmission has a zone address within the predetermined set of zone addresses for the site and said received transmission has third type control information, the database of the site in accordance with said data identifying the identifiers of the transmission requests which should be stored in the database of a site.

28. The method according to claim 24 wherein said batching instructions of said second type of control information includes a time when the batch should be transmitted by a time, and said transmitting step further comprises the step of transmitting at each of said sites transmission requests batched by the site at said time defined by said batching instructions of said second type of control information.

29. A system for centrally controlling the batching of transmissions from a plurality of transmission sites in a zone comprising:

means for storing in a master database for the zone transmission requests to be batch transmitted by said transmission sites;

means for sending the transmission requests to each site;

means for receiving and storing at each site said transmission requests in a site database; and means for sending instructions to each site to batch transmit one or more transmission requests stored in the site database; and means at each site for receiving said instructions, batching said transmission requests stored in the database at the site in accordance with said instructions, and transmitting said batched transmission requests.

30. The system according to claim 29 further comprising:

means for removing from said master database said transmission requests which are specified by said instructions for batch transmitting by the sites.

31. The system according to claim 29 wherein said instructions specify a time for each site to transmit said batched transmission requests, and each said site transmits said batched transmission requests at said time.

32. The system according to claim 29 further comprising:

means at each site for removing from the site database transmission requests which have been batched.

33. The system according to claim 29 further comprising means for determining when the transmission requests stored at each of the site database corresponds to the transmission requests stored in the master database, and disabling any site from batching and transmitting transmission requests when the database of the site does not correspond to the master database until the database of the site corresponds to the master database.

34. The system according to claim 33 further comprising means at each of said sites for determining when a sent instruction was lost, and not enabling transmission of said batched data, until said determining means determines that the database at the site corresponds to the master database.

35. The system according to claim 33 further comprising means at each of said sites for not enabling transmission of said batched data when said site database lacks any one of said transmission requests specified by said instructions, until said determining means determine that the database at the site corresponds to the master database.

36. The system according to claim 29 further comprising a control point wherein said storing means, sending transmission request means, receiving means, sending instruction means are located at said control point.

37. The system according to claim 29 wherein said zone represents a first zone, and said system further comprises:

a plurality of transmitting sites grouped into one or more zones in which one of said zones represents said first zone;

each of said zones having operative said means for storing, means for sending transmission request, and means for sending instructions; and each of said transmitting sites is responsive to transmissions directed to one of more of said zones with which said site is associated when enabling said means for receiving and storing, and said means for receiving, batching and transmitting.

38. A method for centrally controlling the batching of transmissions from a plurality of transmission sites in a zone comprising the steps of:

storing in a master database for the zone transmission requests to be batch transmitted by said transmission sites;

sending the transmission requests to each site;

receiving and storing at each site said transmission requests in a site database; and sending instructions to each site to batch transmit one or more transmission requests stored in the site database;

receiving at each site said instructions;

batching said transmission requests stored in the database at the site in accordance with said instructions; and transmitting said batched transmission requests.

39. The method according to claim 38 further comprising the step of:

determining when the transmission requests stored at each of the site database corresponds to the transmission requests stored in the master database; and disabling any site from batching and transmitting transmission requests when the database of the site does not correspond to the master database until the database of the site corresponds to the master database.

40. A controller for linking transmission control to multiple transmission sites over a wide area in which said sites are grouped into one or more zones, said controller comprising means for receiving transmission requests and associating a unique identifier to each of said transmission requests, and for sending transmissions having control information to sites in one or more zones by addressing each of said transmissions with one of a plurality of zone addresses in which each of said zone addresses defines one or more zones, wherein said control information is one of a plurality of different types in which a first of said types of control information has one of said received transmission requests and its associated identifier, and a second of said types of control information has batching instructions identifying the transmission requests in accordance with their associated identifiers to be batched transmitted by a site.

41. A transmission site for batching transmission requests comprising:

a transmission controller for receiving transmissions having control information and responding to said received transmissions having a zone address within a predetermined set of zone addresses, said control information being one of a plurality of different types in which a first of said types of control information has a transmission requests and its associated identifier, and a second of said types of control information has batching instructions identifying the transmission requests in accordance with their associated identifiers to be batched transmitted by a site;

a database for storing received transaction requests with their associated identifier;

said transmission controller responsive to receiving said first type of control information stores the transmission request and associated identifier of said first type control information in the database at the site; and said transmission controller responsive to said second type of control information batches the transmission requests stored in the database of the site having identifiers identified by the batching instructions of said second type of control information, and transmits said batched transmission requests.

42. A system for batching transmissions from remote sites comprising:

a controller for receiving data for transmission having means for sending said data in packets to remote sites associated with a zone, and means for sending batching instruction to said remote sites to cause batching and transmission of said data from said sites.

* * * * *